April 17, 1934.  C. L. ARBUCKLE  1,955,217

JUICE EXTRACTOR

Filed Jan. 5, 1933  3 Sheets-Sheet 1

Inventor
C. L. Arbuckle

By Clarence A. O'Brien
Attorney

April 17, 1934.  C. L. ARBUCKLE  1,955,217
JUICE EXTRACTOR
Filed Jan. 5, 1933   3 Sheets-Sheet 2

Inventor
C. L. Arbuckle

By Clarence A. O'Brien
Attorney

April 17, 1934.　　C. L. ARBUCKLE　　1,955,217
JUICE EXTRACTOR
Filed Jan. 5, 1933　　3 Sheets-Sheet 3
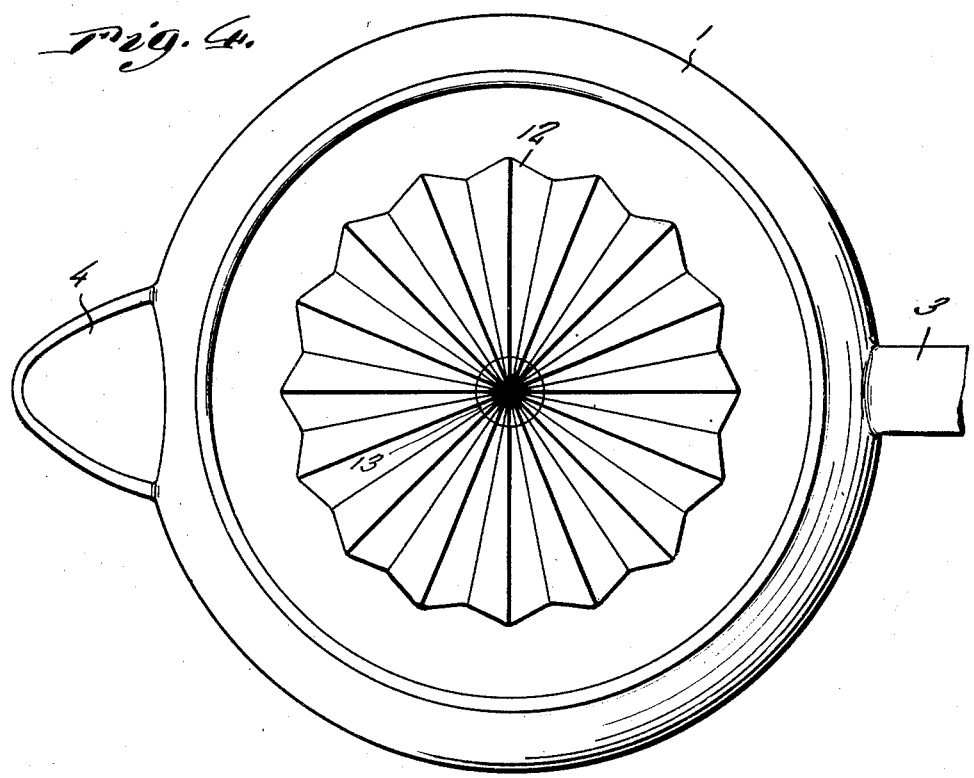
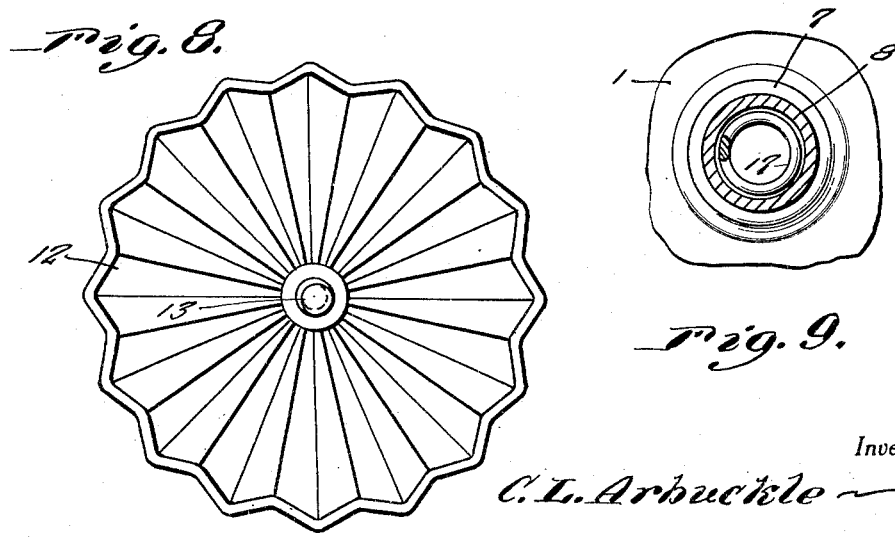
Inventor
C. L. Arbuckle
By Clarence A. O'Brien
Attorney Patented Apr. 17, 1934

1,955,217

UNITED STATES PATENT OFFICE 1,955,217

JUICE EXTRACTOR

Charles L. Arbuckle, Lakeport, Calif.

Application January 5, 1933, Serial No. 650,315

1 Claim. (Cl. 146—3)

The present invention relates to new and useful improvements in juice extractors and has for one of its important objects to provide, in a manner as hereinafter set forth, a device of this character embodying novel mounting and actuating means for a burr through the medium of which substantially all of the juice may be rapidly extracted from fruits, such as oranges, lemons and grape fruit.

Another important object of the invention is to provide a fruit juice extractor of the aforementioned character embodying novel means through the medium of which the seeds and pulp will be removed from the extracted juice before said juice leaves the device.

Another important object of the invention is to provide a fruit juice extractor of the character described, embodying novel means through the medium of which the same may be detachably mounted for use on a vertical support, such as a wall or post.

Other objects of the invention are to provide a fruit juice extractor of the character set forth which will be simple in construction, strong, durable, highly efficient and reliable in use, compact, light in weight, attractive in appearance and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 4 is a view in top plan thereof.

Figure 8 is a detail view in bottom plan of the substantially conical, corrugated or fluted burr.

Figure 9 is a view in horizontal section, taken substantially on the line 9—9 of Figure 3.

Figure 3:
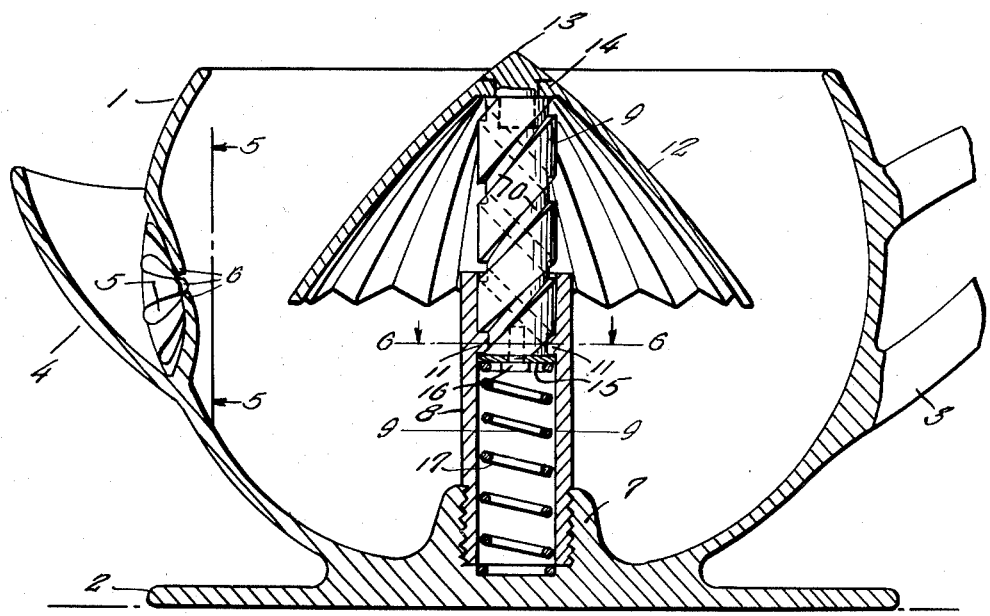
Figure 3 is a view in vertical longitudinal section through the extractor.
Figure 5:
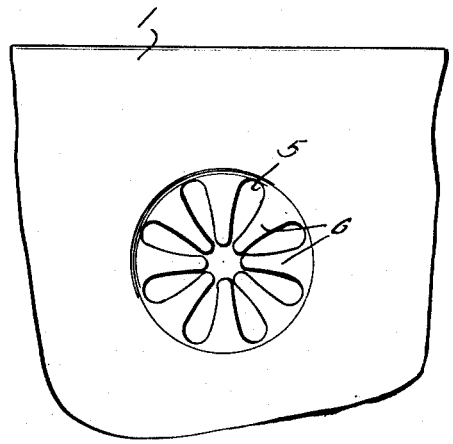
Figure 5 is a detail view in elevation, looking at the outlet opening of the bowl with the strainer fingers therein from the line 5—5 in Figure 3 of the drawings.
Figure 6:
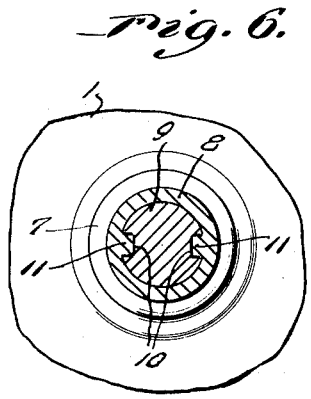
Figure 6 is a view in horizontal section, taken substantially on the line 6—6 of Figure 3.

Referring now to the drawings in detail, it will be seen that the embodiment of the present invention which has been illustrated comprises a bowl 1 of any suitable material which is formed integrally with a base 2. On one side of the bowl 1 is a handle 3 and projecting from the diametrically opposite side of said bowl is a discharge spout 4 communicating, at its inner end, with an outlet opening 5 in said bowl 1. Formed integrally with the periphery of the outlet opening 5 in the bowl 1 is a plurality of inwardly extending strainer fingers 6 which are illustrated to advantage in Figures 3 and 5 of the drawings.

Rising centrally from the bottom of the bowl 1 is an internally threaded socket 7 which threadedly receives a cylinder 8. Operable in the cylinder 8 is a plunger 9 having spiral grooves 10 therein. Lugs 11 project inwardly from diametrically opposite sides of an upper portion of the cylinder 8 and are engaged in the grooves 10 for imparting rotary movement to the plunger 9 as said plunger is moved longitudinally in the cylinder 8. The reference numeral 12 designates a substantially conical fluted or corrugated burr which is detachably secured on the outer end of the plunger 9 for rotation with said plunger through the medium of a bolt 13 having a substantially conical head. The outer end of the plunger 9 is provided with a threaded socket which receives the bolt 13. The small end of the burr 12 has formed thereon an inwardly directed flange 14 which is secured between the head of the bolt 13 and the outer end of the plunger 9.

The reference numeral 15 designates a disk which is detachably secured on the lower end of the plunger 9 by a bolt 16 which is threaded into said plunger. The disk 15 closes the spiral grooves 10 at the lower end of said spiral grooves. The plunger 9 is yieldingly urged outwardly by a coil spring 17 which is mounted in the cylinder 8.

In use, the extractor may be mounted on a table, desk or other horizontal support through the medium of the base 2. A halved fruit is engaged on the burr 12 and pressed downwardly into the bowl 1 for depressing the plunger 9 against the tension of the coil spring 17. As the plunger 9 is thus moved longitudinally in the cylinder 8, rotary movement is imparted thereto, and consequently to the burr 12, by the lugs 7 which are engaged in the spiral grooves 10. After the burr 12 has been manually moved inwardly, the pressure is lightened to permit the coil spring 17 to raise said burr, the direction of rotation, of course, being reversed. The outward movement of the plunger 9 under impulsion by the coil spring 17 is limited by the disk 15 which, as previously stated, closes the lower ends of the spiral grooves 10.

Figure 1:
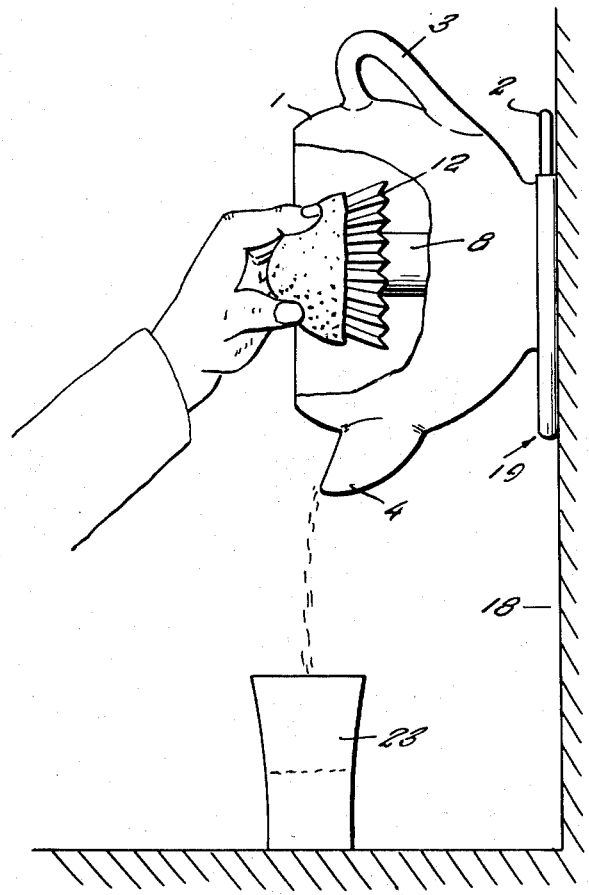
Figure 1 is a view in side elevation, showing an extractor in accordance with the present invention in use on a wall or other vertical support, a portion of the bowl being broken away.
Figure 7:
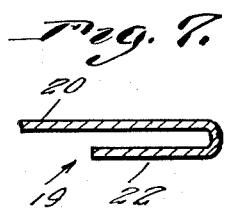
Figure 7 is a horizontal sectional view, taken substantially on the line 7—7 of Figure 2.
Figure 2:
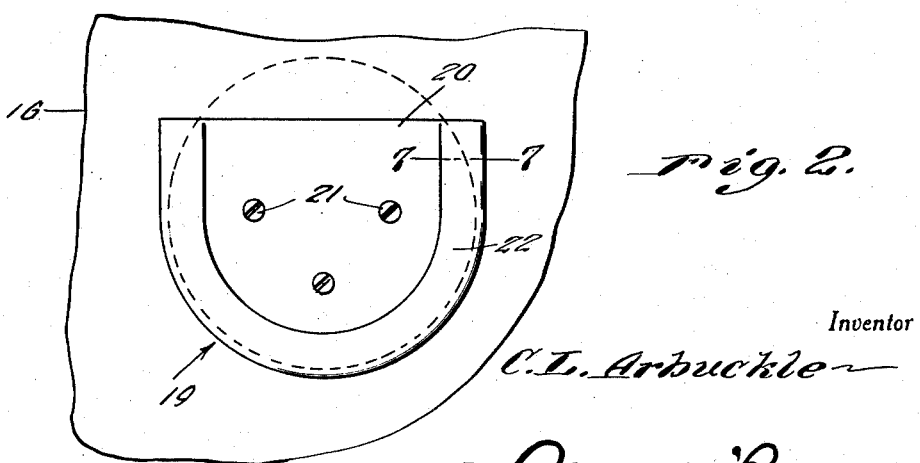
Figure 2 is a detail view in front elevation of the bracket or support through the medium of which the extractor may be detachably mounted on a wall, post or other vertical support.

Should it be desired, the extractor may be removably mounted on a vertical support, such as a wall 18 as seen in Figure 1 of the drawings, through the medium of a bracket which is designated generally by the reference numeral 19. The bracket 19 comprises a flat sheet of metal 20 which is substantially U-shaped in front elevation and which is provided with a plurality of openings which receive securing screws 21. Formed integrally with all but the upper marginal edge of the sheet 20 is a forwardly and inwardly directed integral flange 22 which, in conjunction with said sheet 20, defines a channel for the reception of the base 2, as indicated in broken lines in Figure 2 of the drawings. As will be apparent, the base 2 may be slipped into the bracket 19 from the top of said bracket.

The extracted juice is, of course, discharged from the bowl 1 through the spout 4. When passing through the outlet opening 5 of the bowl, substantially all of the seeds and the pulp will be removed from the juice by the strainer fingers 6. When the extractor is mounted on a wall or other vertical support, as seen in Figure 1 of the drawings, a receptacle may be positioned beneath the discharge spout 4 to receive the juice as it is extracted, as indicated at 23. The conical head of the bolt 13 is ribbed, as seen in Figure 4 of the drawings, the ribs constituting continuations of the corrugations or flutes of the burr 12.

It is believed that the many advantages of a fruit juice extractor constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

A juice extractor comprising a bowl, an upwardly extending boss on the central part of the bottom of the bowl and having a threaded socket therein, a cylinder open at both ends and having its lower end threaded in the socket, said cylinder having inwardly extending projections thereon, a plunger extending into the cylinder and having spiral grooves therein engaged by the projections, a disk fastened to the bottom of the plunger and closing the lower ends of the grooves, a spring in the cylinder having its upper end bearing against the disk and its lower end against the bottom of the socket and a burr detachably connected to the upper end of the plunger.

CHARLES L. ARBUCKLE.